United States Patent
Ford et al.

(10) Patent No.: US 6,776,434 B2
(45) Date of Patent: Aug. 17, 2004

(54) DRIVER SIDE AIRBAG WITH A BAFFLE

(75) Inventors: Brian Christopher Ford, Mt. Clemens, MI (US); Lawrence Richard Langbeen, Attica, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 09/992,981

(22) Filed: Nov. 6, 2001

(65) Prior Publication Data

US 2003/0085553 A1 May 8, 2003

(51) Int. Cl.[7] .............................................. B60R 21/24
(52) U.S. Cl. .................................... 280/729; 280/740
(58) Field of Search ............................... 280/729, 731, 280/739, 740

(56) References Cited

U.S. PATENT DOCUMENTS

| | | | | |
|---|---|---|---|---|
| 3,586,347 A | * | 6/1971 | Carey et al. | 280/729 |
| 3,610,657 A | * | 10/1971 | Cole | 280/729 |
| 4,262,931 A | * | 4/1981 | Strasser et al. | 280/729 |
| 4,265,468 A | * | 5/1981 | Suszko et al. | 280/729 |
| 4,360,223 A | * | 11/1982 | Kirchoff | 280/729 |
| 5,573,270 A | * | 11/1996 | Sogi et al. | 280/740 |
| 5,632,506 A | * | 5/1997 | Shellabarger | 280/728.1 |
| 5,913,535 A | * | 6/1999 | Taguchi et al. | 280/729 |
| 5,918,902 A | * | 7/1999 | Acker et al. | 280/743.1 |
| 6,283,499 B1 | | 9/2001 | Nelson et al. | 280/729 |
| 6,530,593 B1 | * | 3/2003 | Ross et al. | 280/729 |
| 6,612,609 B1 | * | 9/2003 | Rodriguez et al. | 280/729 |

FOREIGN PATENT DOCUMENTS

| | | |
|---|---|---|
| DE | 4121659 A | 1/1993 |
| DE | 10011066 A | 9/2001 |
| EP | 0844149 A | 5/1998 |
| EP | 1033292 A | 9/2000 |
| WO | WO 99/42332 | 8/1999 |

* cited by examiner

Primary Examiner—Faye M. Fleming
(74) Attorney, Agent, or Firm—Lonnie Drayer; Jarett Rieger

(57) ABSTRACT

An airbag comprising a baffle and a heat shield. The baffle contains an opening, which is aligned with at least one-half of the inflator opening and having an area that is at minimum one-half of the area of the inflator opening. Inflation gas from an inflator flows into the baffle and then enters the airbag by way of the baffle opening. Because of the tortuous flow of the inflation gas inside the baffle, the hot particulates fall to the bottom of the baffle and thus never come into contact with the inflatable cushion.

20 Claims, 5 Drawing Sheets

DRIVER SIDE AIRBAG WITH A BAFFLE

BACKGROUND OF THE INVENTION

The invention generally relates to an airbag and more particularly one which contains a baffle for trapping particulates.

The purpose of an airbag is to protect a vehicle occupant during an automobile crash. As is known in the art, an airbag can be located virtually on any part of the vehicle. Airbags that are utilized to protect the driver are usually installed in the steering wheel, while the airbags that are utilized to protect the front passenger are installed in the instrument panel.

A gas-producing device such as a pyrotechnic inflator typically inflates a driver side airbag. A pyrotechnic inflator generally comprises a solid generant to generate inflation gas. At the onset of a crash, the gas generant burns producing inflation gas, which is used to fill a vehicle airbag.

The gas generating composition must burn very rapidly to inflate toil the airbag, for example in 30 milliseconds or less, but the burn rate must be controllable and reproducible to ensure airbag deployment and inflation in the required time, location, and configuration. Since the gas generant must burn very rapidly to inflate the airbag, the produced inflation gases may reach temperatures of about 590° C. or higher. These high temperature gases may be detrimental to the integrity of the airbag fabric.

Another problem associated with pyrotechnic inflators is the occurrence of burn holes in the airbag from hot particulates within the inflation gas. The particulates can originate from unburned gas generant or from solid combustion particles. The solid particles or what is generally referred to as "slag" or "clinkers" are formed by the combustion of gas generants containing metallic compositions. A filter is generally utilized to remove the particulates from the inflation gas, thereby preventing the particulates from entering into the airbag. There is a chance that some particulates will pass through the filter in the inflator into the airbag. These particulates are extremely hot and they tend to stick to the interior of the inflatable cushion, and because the airbag is typically made from nylon or another fabric, the hot particulates can cause small holes to appear in the cushion. This might release the hot inflation gas potentially affecting the inflation profile of the airbag.

U.S. Pat. No. 6,283,499 B1 teaches an airbag device having an inner bag, disposed in between the outer bag and the inflator, wherein the inner bag is made of a flexible material and protects the outer bag from hot gases and particles emanating from the inflator.

SUMMARY OF THE INVENTION

In the present invention, an airbag comprises an inflatable cushion, a heat shield, and a baffle. The heat shield and the baffle are preferably made from a different material than the inflatable cushion. The baffle contains a baffle opening and this opening provides an inflation gas passageway from the baffle to the inflatable cushion. The baffle opening is aligned with approximately one-half of the inflator opening and has an area that is approximately equal to the area of the inflator opening.

BRIEF DESCRIPTION OF THE DRAWINGS

The features of the invention which are believed to be novel are set forth with particularity in the appended claims. The present invention, both as to its structure and manner of operation, may best be understood by referring to the following detailed description, taken in accordance with the accompanying drawings.

DETAILED DESCRIPTION OF THE INVENTION

In the present invention, an airbag has a baffle 2 for protecting the inflatable cushion 16 from being damaged by hot inflation gas and hot particulates 13. The inflatable cushion is made from a woven nylon fabric, preferably a 315 Denier nylon, and the inflatable cushion may be coated with urethane, silicon, etc. According to this invention, the baffle is preferably made from a different material then the inflatable cushion, since it must be able to withstand greater temperatures. The baffle is made from a coated woven nylon fabric, preferably, the nylon is 840 Denier with a 0.204 kg per meter silicon coating. One skilled in the art would appreciate that different materials could be used for the invention. Other materials for the baffle include uncoated nylon, polyester, polyolefins, polyamides such as Kevlar®, amides such as Nomex®, or any type of film or woven fabric that can withstand the forces and heat generated during the deployment of the airbag. The coatings may be applied to increase thickness, weight, and decrease permeability.

Figure 1:
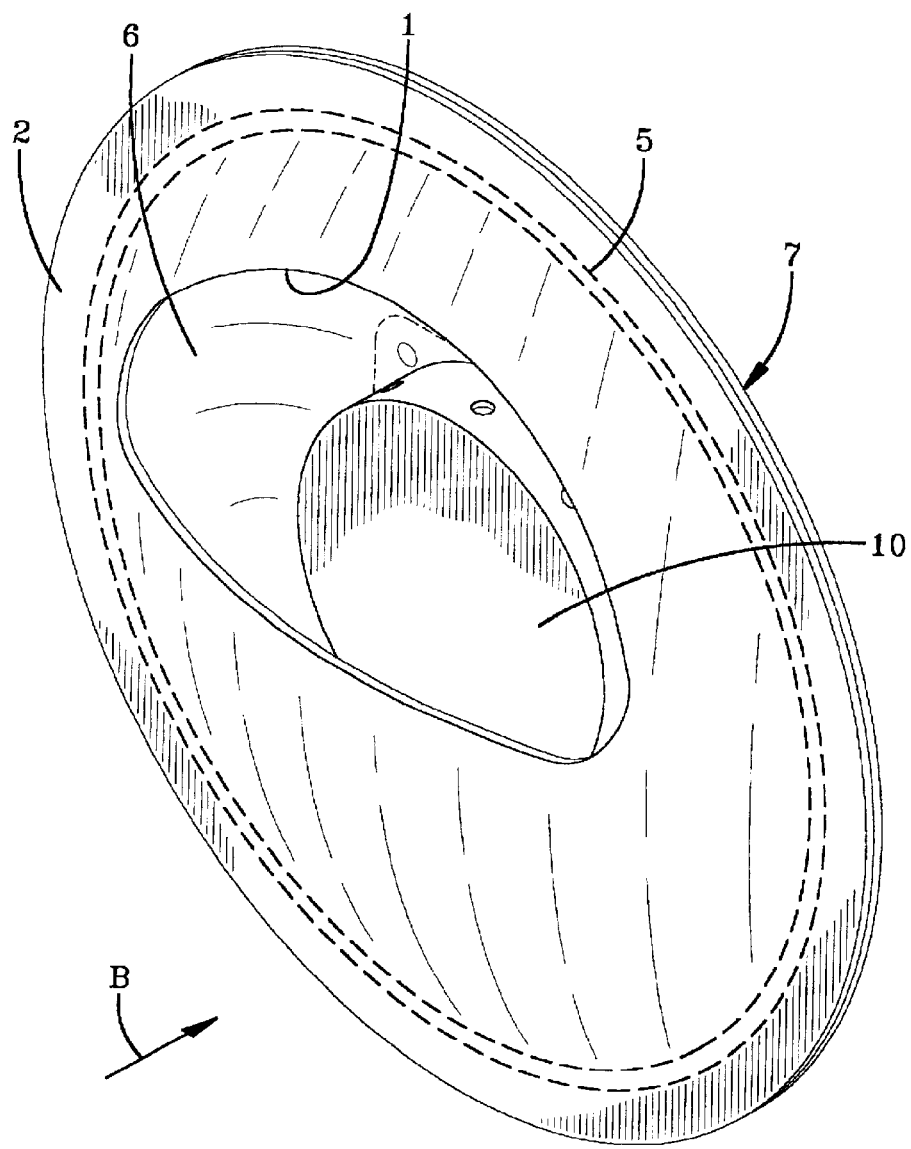
FIG. 1 is a perspective view of a heat shield, baffle, and inflator in accordance with the present invention.

The baffle 2 is attached to the heat shield 6 by stitching. Similar to the baffle, the material used to make the heat shield is different from the material used to make the inflatable cushion 16. The heat shield 6 can be made from the same materials used to make the baffle as discussed above. It is preferred for the baffle to be sewn to the heat shield around the perimeter approximately 10 mm from the edge of the heat shield 6, using a double needle chain stitch 5. Also shown in FIG. 1 is the stitching pattern used to attach the heat shield 6 to the inflatable cushion 16. One of the sew lines 3 is in a circular configuration and surrounds the inflator opening 4. The second sew line 3 has a square-like configuration and also surrounds the inflator opening 4. One skilled in the art would realize that there are many other suitable methods of attaching the baffle to the heat shield and the heat shield to the inflatable cushion.

The baffle 2 has an opening 1 to allow inflation gas to pass from the baffle to the inflatable cushion 16. The baffle opening 1 represented in FIG. 1 has an area that is at a minimum one-half of the area of the inflator opening 4. It is preferred that the baffle opening has an area that is approximately double to the size of the inflator opening.

The baffle opening 1 is located so that the baffle opening is aligned with at least one-third of the inflator opening 4 when the airbag is fully inflated. Preferably, the baffle opening 1 is aligned with approximately one-half of the inflator opening 4. When the baffle opening 1 is aligned with one-half of the inflator opening 4, about one-half of the inflator opening 4 is visible when looking through the baffle 2 towards the inflator in a direction B. Direction B is parallel to the longitudinal axis A of the inflator 10 (see FIG. 5) yielding a view such as shown for example in FIG. 2. FIG.

2 shows a baffle 2 aligned with about half of the inflator opening 4 because only about half of the inflator opening 4 can be seen.

Figure 3:
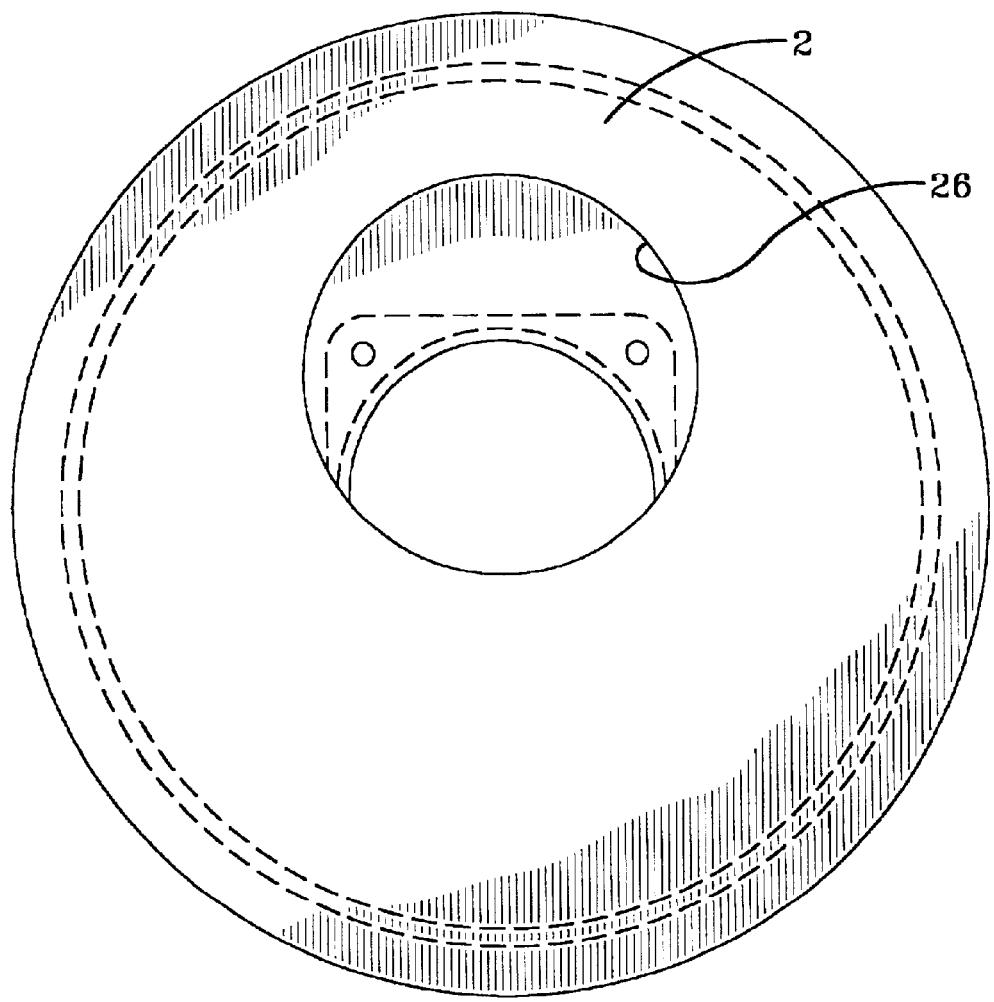
FIG. 3 is a second embodiment of the heat shield and baffle.
Figure 4:
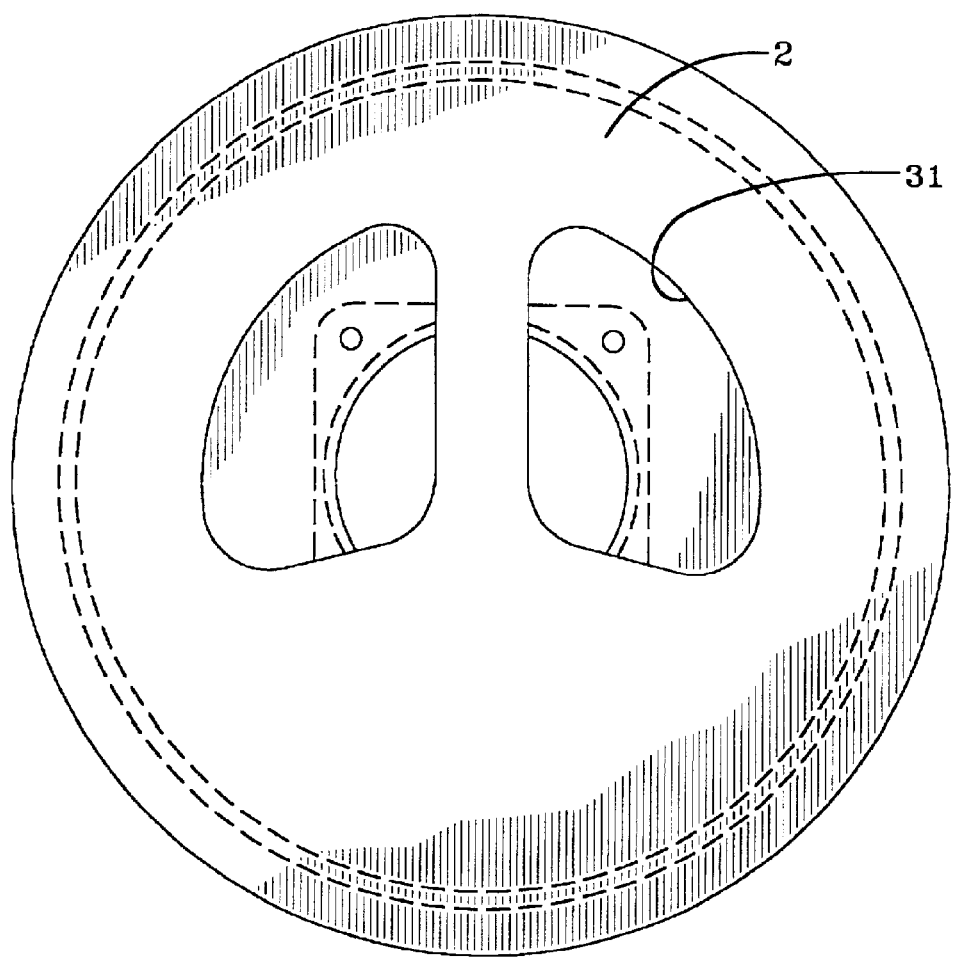
FIG. 4 is a third embodiment of the heat shield and baffle.

As shown in FIG. 1, the baffle opening 1 has substantially an oval shape. The bottom portion extends from approximately the centerline of the inflator 10, the top extends slightly above the top of the inflator, and the sides extend slightly beyond the sides of the inflator. FIGS. 3 and 4 show two alternative embodiments for the baffle opening 1 in the present invention. The baffle opening 26 in FIG. 3 has substantially a circular shape. Unlike the baffle openings in the other embodiments, the baffle as shown in FIG. 4 has two baffle openings 31. Each of the baffle openings 31 in FIG. 4 has substantially the shape of a quarter circle.

Figure 5:
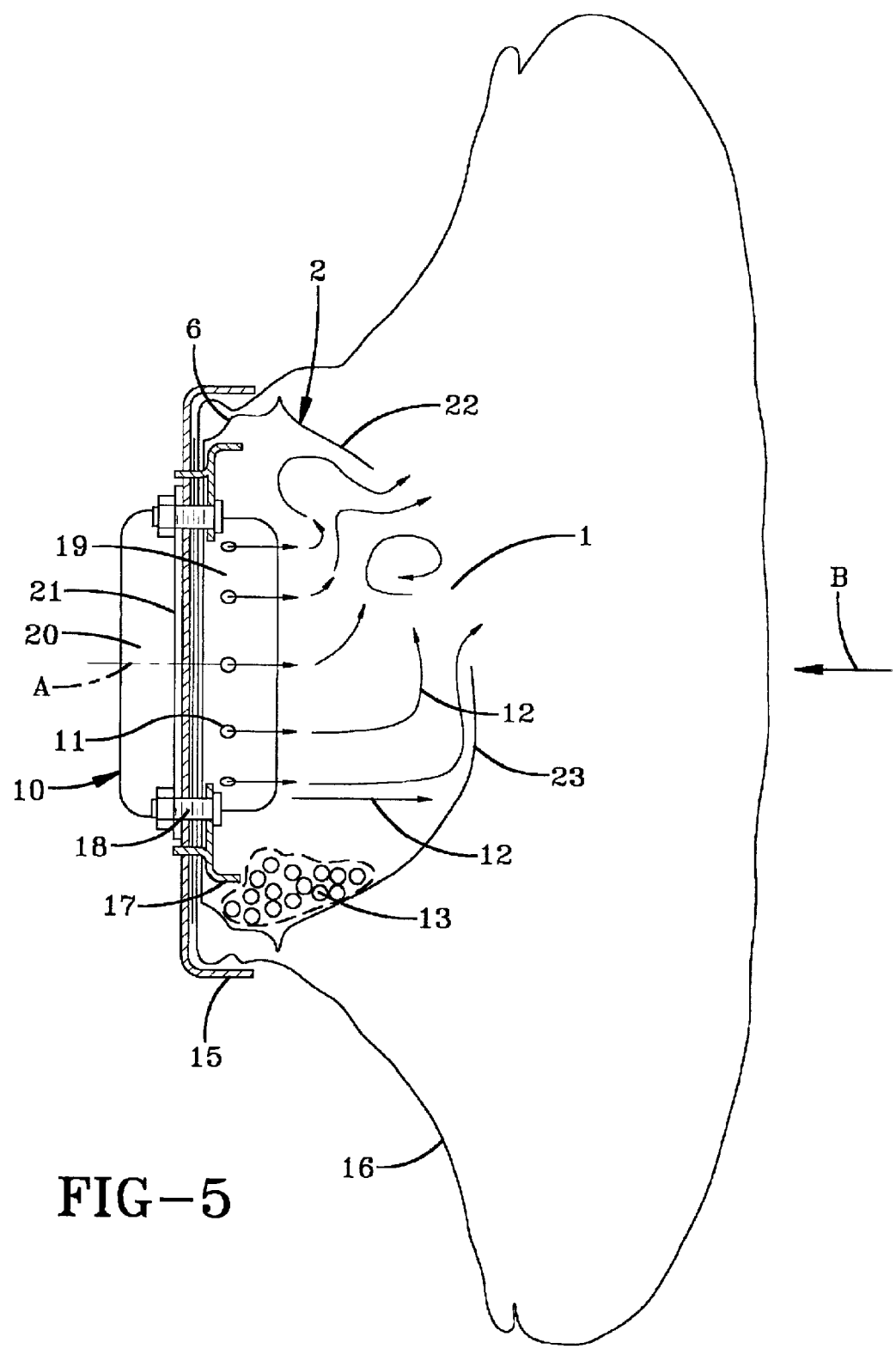
FIG. 5 is a cross section of the present invention.

FIG. 5 shows a cross-section of an inflatable cushion 16 having a baffle 2. In the event of a vehicle crash, an inflator 10 is actuated and releases inflation gas into the inflatable cushion 16. The rapid burning of a gas generant stored inside the inflator 10 generates the inflation gas. The inflator 10 has an upper portion 19 and a lower portion 20. The upper portion 19 is the portion of the inflator 10 enclosed by the airbag and has a plurality of outlet ports 11. The outlet ports 11 provide the escape path for the inflation gas from the inflator to the baffle 2. The inflator 10 includes a square flange 21 for receiving studs 18. The square flange can be disposed adjacent to an airbag housing 15, which is secured to the steering wheel armature (not shown). The inflatable cushion 16 is secured to the inflator by a retainer ring 17, which surrounds the upper portion 19 of the inflator. The retainer ring 17 is attached to the airbag housing 15 and the square flange via studs 18. One method of attaching the inflatable cushion to the inflator has been discussed, but one skilled in the art appreciates that there other suitable methods of attachment.

The present invention has a baffle 2 and a heat shield 6; the baffle and the heat shield can collectively be referred to as an inner airbag 7. If this nomenclature is utilized, then the inflatable cushion 16 can be referred to as an outer airbag. The baffle 2 and heat shield 6 of the present invention provides the inflatable cushion protection from the harmful affects of the hot inflation gases and hot particulates. The baffle 2 provides the advantage of altering the flow path of the inflation gas. For an inflatable cushion without a baffle, the inflation gas flow from the inflator is laminar or has little turbulence because there are no obstructions between the inflator and the inflatable cushion. Without a baffle, all of the particulates exiting the inflator will flow into the inflatable cushion whereby they can burn holes in the inflatable cushion.

For an airbag having a baffle 2, the hot inflation gas travels first into the baffle 2 and then flows into the inflatable cushion 16 by way of the baffle opening 1 shown in FIG. 5. The arrows 12 represent a possible pathway for the inflation gas. A portion of the inflation gas hits the lower portion 23 of the baffle and is redirected upward until it contacts the upper portion 22 of the baffle. At this point, the inflation gas bounces off of the upper portion 22 and flows downward. This inflation gas eventually comes into contact with the remaining inflation gas that is being directed upward from the lower portion 23 of the baffle. This contact from the inflation gas creates a "vortex" or whirlpool that slows the inflation gas enough to cause the particulates to drop to the bottom of the baffle 2 due to gravity. This tortuous flow path for the inflation gas increases the likelihood that the hot particulates will fall to the bottom of the baffle 2 and not enter the inflatable cushion. In addition, some of the particulates contained within the gas stream will impinge directly on the baffle, so that they stick to the baffle and do not enter the cushion. Also, the baffle and the heat shield effectively surround the upper portion 19 of the inflator 10 thereby protecting the inflatable cushion 16 from direct contact with the hot surfaces of the inflator.

The presence of the baffle 2 within the inflatable cushion 16 has no bearing on the deployment trajectory of the inflatable cushion. This is because when the gas flow begins, the cushion is in its compressed or folded state. In the first milliseconds after initiation of the gas flow, the baffle is the first portion of the cushion to be pressurized due to its proximity to the inflator, causing it to quickly fill and form the inner bag. By the time the cushion interacts with the occupant, the baffle is fully deployed and a steady-state exists where the inflation gas leaves the inner bag at a predictable rate that does not affect the trajectory. The airbag module is positioned in the steering wheel so the airbag is deployed at an angle towards the chest/sternum area of a vehicle occupant, where forces can be absorbed most readily due to natural stiffness and support in the human body. The present invention does not influence the direction of deployment for the inflatable cushion 16.

Figure 2:
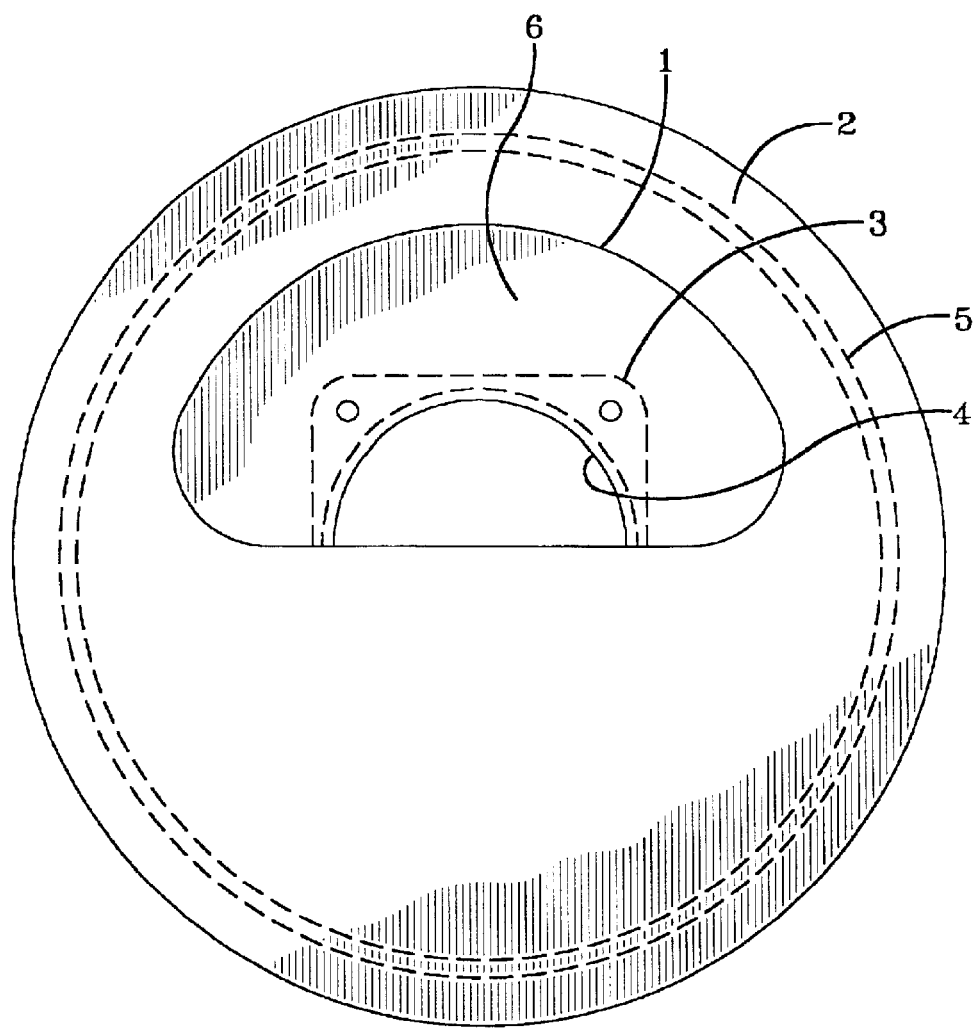
FIG. 2 shows the heat shield and baffle of FIG. 1 viewed from direction B.

The baffle opening 1 as illustrated in FIG. 2 is substantially located in the upper portion of the baffle 2. It can be appreciated that other locations for the baffle opening will also create a tortuous flow for the inflation gas. For example, the baffle opening 1 with a substantially oval shape as shown if FIG. 2 can also be positioned substantially in the lower portion 23 of the baffle.

As used herein and in the claims, terms describing locations such as "upper", "below", and so forth are understood to relate to the airbag as shown in the drawings and the orientation of the components in a steering wheel in a vehicle in its operative position.

Many changes and modifications in the above-described embodiments of the invention can, of course, be carried out without departing from the scope thereof. Accordingly, that scope is intended to be limited only by the scope of the appended claims.

We claim:

1. An airbag comprising:

an inflatable cushion made from a first material having an inflator opening to accommodate receipt of an inflator, the inflator having a longitudinal axis;

a baffle comprising a second material and a baffle opening, the baffle opening being aligned with at least one-third of the inflator opening and having an area that is approximately double the area of the inflator opening, wherein the baffle opening is present in the baffle before the airbag is filled with inflation gas from the inflator, and wherein upon inflation the inflator opening is visible when looking through the baffle opening in a direction parallel to the longitudinal axis of the inflator; and a heat shield having the inflator opening to accommodate receipt of the inflator, the heat shield is made from a material different from that comprising the inflatable cushion.

2. An airbag according to claim 1 wherein the baffle opening is aligned with approximately one-half of the inflator opening.

3. An airbag according to claim 1 wherein the heat shield is attached to the baffle.

4. An airbag according to claim 1 wherein the baffle opening has an oval shape.

5. An airbag according to claim 1 wherein the baffle opening has a circular shape.

6. An airbag according to claim 1 wherein the baffle has two baffle openings.

7. An airbag according to claim 1 wherein the baffle comprise an upper section and a lower section, the baffle opening is substantially located in the upper section of the baffle.

8. An airbag according to claim 1 wherein the baffle and the heat shield are made from a coated woven nylon fabric.

9. An airbag according to claim 1 wherein the heat shield is attached to the baffle by using double needle chain stitch, the stitching is approximately 10 mm from the edge of the heat shield.

10. An airbag according to claim 1 wherein the baffle opening is disposed in the baffle so that a portion of the inflation gas passes through the baffle opening without contacting the baffle, the portion being slowed by a vortex created by the remaining portions of the inflation gases that hit the baffle.

11. An airbag according to claim 1 wherein the baffle opening is disposed in the baffle so that the baffle has no influence on the deployment trajectory of the airbag.

12. An airbag comprising:
   an inflatable cushion made from a first material having an inflator opening to accommodate receipt of an inflator; the inflator having a longitudinal axis A; and
   a baffle comprising a second material and a baffle opening, the baffle opening being aligned with at least one-third of the inflator opening and having an area that is approximately double the area of the inflator opening, wherein the baffle opening is present in the baffle before the airbag is filled with inflation gas from the inflator and wherein upon inflation the inflator opening is visible when looking through the baffle opening in a direction B, B being parallel to the longitudinal axis A of the inflator.

13. An airbag according to claim 12 wherein the baffle opening is aligned with approximately one-half of the inflator opening.

14. An airbag according to claim 12 further comprising a heat shield having an inflator opening to accommodate receipt of the inflator, the heat shield is made from a material different from that comprising the inflatable cushion.

15. An airbag according to claim 14 wherein the heat shield is attached to the baffle.

16. An airbag according to claim 12 wherein the baffle opening has an oval shape.

17. An airbag according to claim 12 wherein the baffle opening has a circular shape.

18. An airbag according to claim 12 wherein the baffle has two baffle openings.

19. An airbag according to claim 12 wherein the baffle comprises an upper section and a lower section, the baffle opening is substantially located in the upper section of the baffle.

20. An airbag according to claim 14 wherein the baffle and the heat shield are made from a coated woven nylon fabric.

* * * * *